Figure 1:
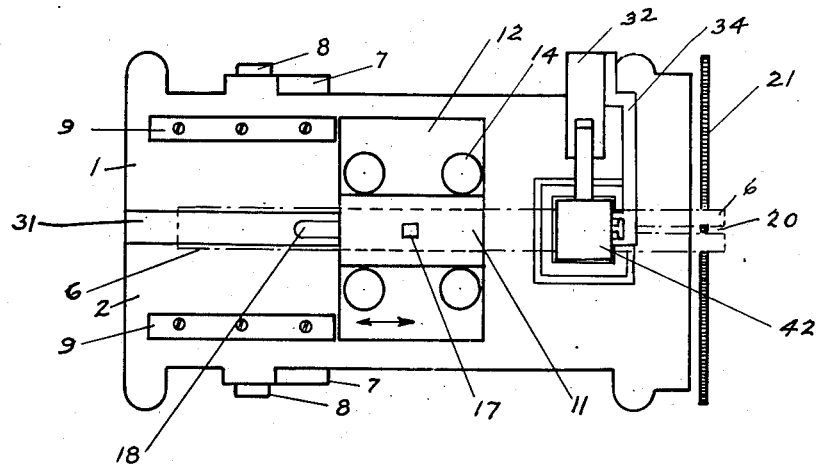

April 26, 1949.  F. R. LA ROSA  2,468,214
COMBINED SLOTTING AND CUTOFF PORTABLE SAW
Filed May 24, 1944  3 Sheets-Sheet 1

Inventor
FRANK R. LA ROSA.
By Howard J. Whelan.
Attorney

April 26, 1949.   F. R. LA ROSA   2,468,214
COMBINED SLOTTING AND CUTOFF PORTABLE SAW
Filed May 24, 1944   3 Sheets-Sheet 3
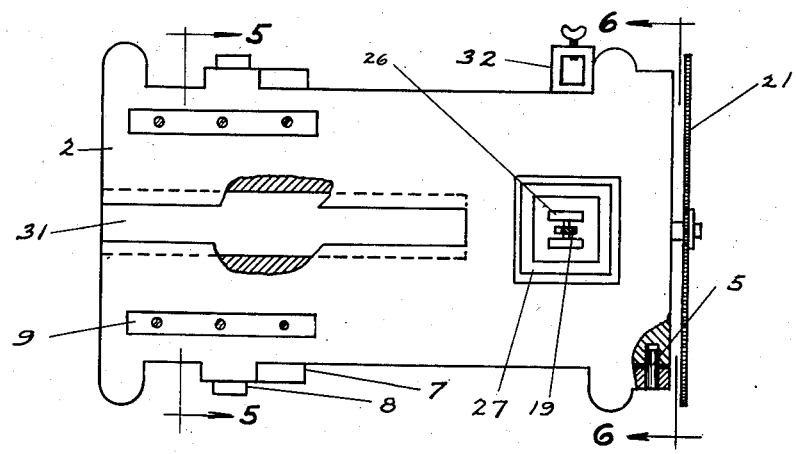
FIG. 4
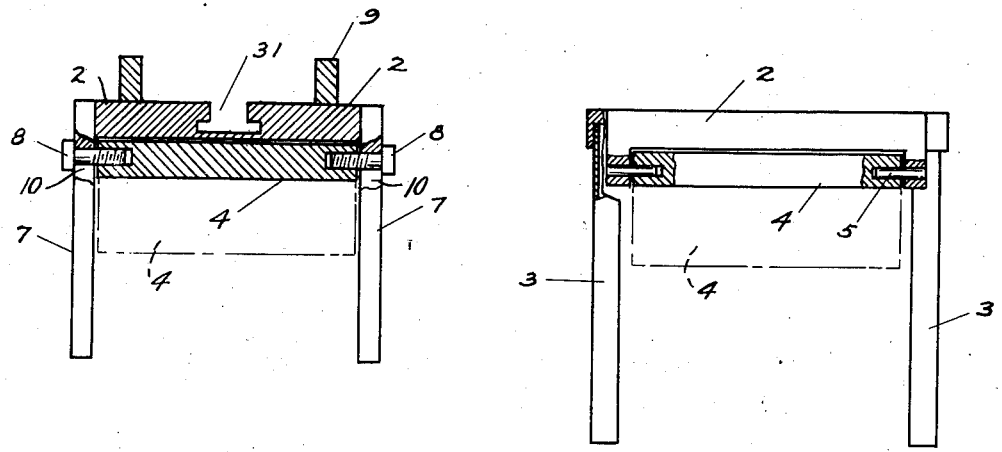
FIG. 5.
FIG. 6.
Inventor
FRANK R. LA ROSA.
By Howard J. Whelan.
Attorney Patented Apr. 26, 1949

2,468,214

UNITED STATES PATENT OFFICE 2,468,214

COMBINED SLOTTING AND CUTOFF PORTABLE SAW

Frank R. La Rosa, Baltimore, Md., assignor of one-half to Antonio Lionello, Baltimore, Md.

Application May 24, 1944, Serial No. 537,071

2 Claims. (Cl. 143—1)

This invention refers to cutting machines and more particularly to a device using plural saws adapted to cut pieces of materials in plural directions or planes.

It has among its objects to provide a machine of this type particularly suited for cutting pipe, bars and rods into predetermined sizes and with suitable cuts or markings. Another object is to provide such arrangements in a machine that is relatively compact and simple in structure, and able to operate with a comparatively small number of mechanisms and other parts, for the purposes in question.

Other objects will become apparent as the invention is more fully set forth.

It is customary to cut pieces of pipe and rods, and perform the slotting and similar machine work in another device located elsewhere. This entails additional carrying efforts and time that increase the cost of production and require various other facilities. In this invention the machine performs plural functions distinct and different from each other, in the one device. It does it automatically and in suitable sequence, at a minimum of costs.

Figure 2:
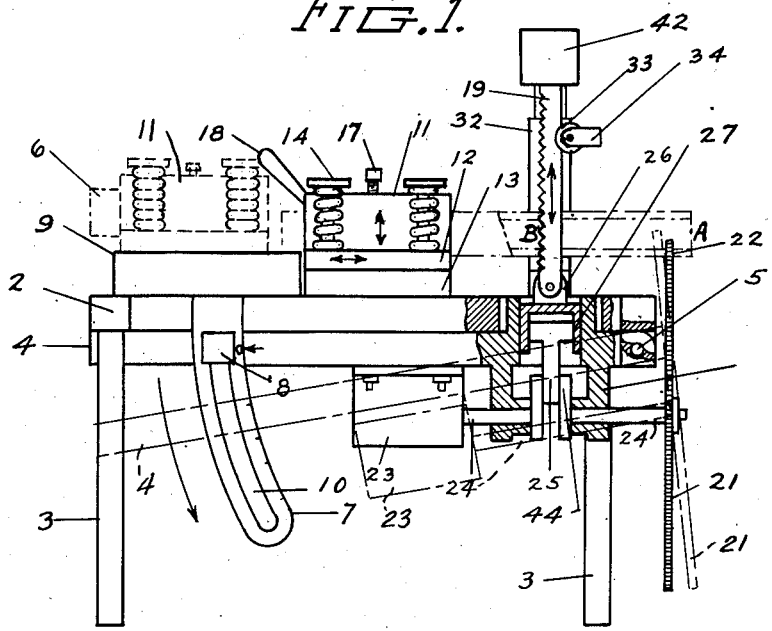
Figure 3:
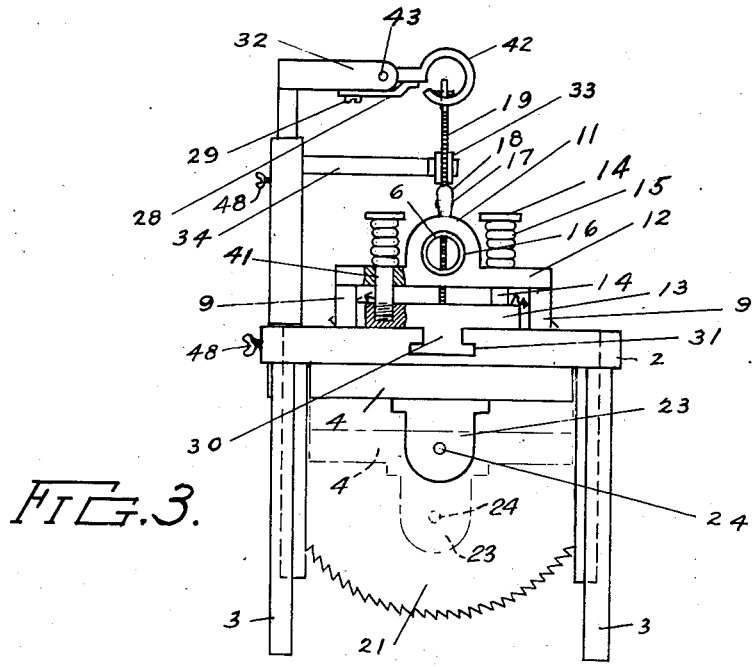

In the drawings is shown an example of a device of this nature, by way of illustration. This device embodies the principles of this invention, and its views in the drawings are as follows:

Figure 1 is a plan view of the device embodying this invention,

Figure 2 is a side elevation of Figure 1 partly in section showing the reciprocating saw operating mechanism, Figure 3 is an end elevation of Figure 1 partly in section and showing the upper carrier section in position on the raised rails, Figure 4 is a plan view of table with the carrier and bracket removed and partly in section, Figure 5 is a sectional view of Figure 4 taken along line 5—5 of said figure, and Figure 6 is an end view taken in direction of arrows 6—6 shown in Figure 4.

Similar reference characters refer to similar parts throughout the drawings.

In the construction indicated, 1 represents a base, which consists of a table top 2, mounted on supporting legs 3 which keep it in a horizontal position. A frame 4 is mounted under the table and hinged to it by the pivot shaft 5 which is disposed at one end. The table supports the material 6 to be processed, while the frame has the operating mechanism for the saws or cutters attached to it to do so. An arm 7 with an arcuate slot 10 therein on each side is held rigidly to the table top 2. A bolt 8 is connected with the frame 4 and passes through the slot 10, which on tightening holds the frame and mechanism in any desired position.

The table top 2 has a pair of raised rails 9 mounted on same at the rear end portion thereof, which run for about one-third of the distance across the table longitudinally. The rails are surmounted by a carrier 11, which runs on same while at that portion of the table. The carrier is in two main sections, its upper and lower parts 12 and 13. The lower section 13 holds bolts 14 screw-threaded into it perpendicularly, which secure coiled springs 15 in place to resiliently engage the upper section 12 through close fitting holes 41 in same. The springs tend to press it towards the table surface. The upper section 12 is hollowed out at 16 (Fig. 3) to receive a bar or cylinder of material 6 to be operated on or processed, and in this instance a piece of pipe is utilized for the purpose. The pipe is held in place by a clamping screw 17 passing through the wall of the upper section into the space 16 where the pipe is located horizontally.

The lower section is less in width than the upper section, so it may travel between the rails 9, when the carrier is pushed manually by its handle 18. As the carrier is moved towards the front of the table top, with the piece of pipe 6 therein, the latter is engaged by a reciprocating saw 19 which cuts vertically into same to make a slot 20 therein in a longitudinal direction until the end of its travel is reached. This makes the length of this slot 20 from A to B. When the carrier moves horizontally towards the front, the upper section 12 remains horizontal throughout its travel by reason of the close fitting bolts 14 projecting up through the body of same. This is in spite of the tendency of the front springs to tilt this section downwardly as it moves beyond the rails. The saw 19 therefore cuts the pipe in the same way until the travel across tracks 9 is ended. When the upper section reaches the end of the rails, it drops straight down into resilient contact on the lower section, and carries the pipe that has been slotted with it. This brings the front of the pipe directly on a circular saw 21 in the position selected for same, and the saw proceeds to cut into same as indicated at 22. The resilient holding of the upper section brings the pipe down gradually and feeds it in accordance with the cutting depth to be performed by this saw. When this is done, the piece of material is released from the upper section of the holder and taken out. The carrier is then brought back to its original position on the rails and a new piece of pipe inserted, with its front end close to the saw 19. The motor 23 on the frame 4 operates the saws 19 and 21 through the shaft 24. The circular saw 21 is directly mounted on and attached to this shaft, while the reciprocating saw 19 is operated through a crank mechanism 44 mounted on the same shaft and arranged to give a reciprocating movement through connecting rod 25 to a cross-head 27 to which the holder 26 is attached. The saw 19 is attached to the holder 26 in a conventional manner and works in a perpendicular direction, the cross-head 27 serving to keep the holder in proper alignment. Roller supports 33 attached to bracket 32 by arm 34 prevents vibration in the saw 19 while cutting. The upper end portion of this saw is kept in tension with a spring 28 held to the saw by the screw 29 pressed against holder 42 which operates on pivot 43. The bracket 32 holds the springs in position above the table, but is through the use of screws 48 adjustable and removably secured to the frame. The tilting of the frame carries all the saw mechanisms with it, which includes the saws, motor, cross-head, bracket and other incidental parts. The tilting of the frame allows the saws to cut the material in the carrier, at different angles, when such is desirable. This is done manually through the tilting of the frame on its pivot shaft 5, and the operation of the bolt 8 in the slot 10 of the arms 7.

The lower section of the carrier has an inverted T-projection 30 that is arranged to travel in a T-slot 31 in the table. This guides the travel of the carrier and holds the bottom section 13 securely in position. The saws are arranged to cut in directions at right angle to one another. The reciprocating saw, stays in the slot cut by it while the rotating saw is operating and simply rides the material about the slot. The depth of slot cut made by the rotating saw, is determined by the drop off the rails 9.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. A cutting machine comprising a table, legs for supporting said table in a horizontal position, a frame, means for pivotedly mounting said frame on said table, a reciprocating saw and a circular saw sequentially arranged on said frame and extending upwardly above said frame and table at one end of said table, operating means for said saws carried by said frame and tiltable therewith, a multi-part carrier for the work mounted on said table for holding and feeding the work sequentially to the saws, resilient means on said carrier for retaining the parts thereof in assembled relation on said table, and raised rails carried by said table at the end thereof removed from said saws, said carrier holding the work to said reciprocating saw while the carrier rides on said rails for a longitudinal cut through the work and said carrier being movable from said rails to the level of said table to hold the work to said circular saw for cutting in a transverse direction.

2. A cutting machine comprising a supporting table, a work holder movable along said table, a vertical saw and a circular saw sequentially arranged at one end of said table, power means for said saws, tiltable means for supporting said power means and said saws, guiding means for said work holder at the opposite end of said table and extending above the level of said table, said work holder when on said guiding means, presenting the work to said vertical saw for a longitudinal cut therethrough, and said work holder when removed from said guiding means to the level of said table presenting the work to said circular saw for a transverse cut therethrough.

FRANK R. La ROSA.

REFERENCES CITED

The following references are of record in the file of this patent:

UNITED STATES PATENTS

| Number | Name | Date |
| --- | --- | --- |
| 132,626 | Brunjes et al. | Oct. 29, 1872 |
| 141,948 | Poe | Aug. 19, 1873 |
| 358,173 | Sturgeon | Feb. 22, 1887 |
| 694,757 | Larson | Mar. 4, 1902 |
| 784,409 | Litz | Mar. 7, 1905 |
| 864,750 | Burpee | Aug. 27, 1907 |
| 945,436 | Anderson | Jan. 4, 1910 |
| 1,030,598 | Miller | June 25, 1912 |
| 2,344,003 | Sheptinsky | Mar. 14, 1944 |